US011302122B2

(12) United States Patent
Choi et al.

(10) Patent No.: US 11,302,122 B2
(45) Date of Patent: Apr. 12, 2022

(54) APPARATUS AND METHOD FOR PREDICTING INJURY LEVEL

(71) Applicants: Hyundai Motor Company, Seoul (KR); Kia Motors Corporation, Seoul (KR); Soonchunhyang University Industry Academy Cooperation Foundation, Chungcheongnam-do (KR)

(72) Inventors: Kyu Sang Choi, Gyeonggi-do (KR); Yong Beom Lee, Chungcheongnam-do (KR); Eun Gi Cho, Chungcheongnam-do (KR); Seong Keun Park, Chungcheongnam-do (KR)

(73) Assignees: Hyundai Motor Company, Seoul (KR); Kia Motors Corporation, Seoul (KR); Soonchunhyang University Industry Academy Cooperation Foundation, Chungcheongnam-do (KR)

( * ) Notice: Subject to any disclaimer, the term of this patent is extended or adjusted under 35 U.S.C. 154(b) by 305 days.

(21) Appl. No.: 16/521,071

(22) Filed: Jul. 24, 2019

(65) Prior Publication Data

US 2020/0294331 A1 Sep. 17, 2020

(30) Foreign Application Priority Data

Mar. 12, 2019 (KR) .......................... 10-2019-0028225

(51) Int. Cl.
*G07C 5/08* (2006.01)
*B60W 40/08* (2012.01)
(Continued)

(52) U.S. Cl.
CPC ........... *G07C 5/0808* (2013.01); *B60W 40/08* (2013.01); *G06N 5/046* (2013.01); *G06N 20/10* (2019.01); *G07C 5/008* (2013.01)

(58) Field of Classification Search
USPC ............................................................ 701/1
See application file for complete search history.

(56) References Cited

U.S. PATENT DOCUMENTS

| 2002/0103622 A1* | 8/2002 | Burge ..................... G16Z 99/00 |
| | | 702/183 |
| 2018/0365772 A1* | 12/2018 | Thompson ............. G06N 7/005 |
| 2020/0294331 A1* | 9/2020 | Choi .................... G07C 5/0808 |

FOREIGN PATENT DOCUMENTS

| KR | 20080095708 A | 10/2008 |
| KR | 101603431 B1 | 3/2016 |

OTHER PUBLICATIONS

Park et al., "Estimation of Driver Injury Severity in Traffic Collisions".

(Continued)

*Primary Examiner* — Tyler D Paige
(74) *Attorney, Agent, or Firm* — Mintz Levin Cohn Ferris Glovsky and Popeo, P.C.; Peter F. Corless

(57) ABSTRACT

An apparatus for predicting an injury level of a user of a vehicle may include: a communication circuit configured to communicate with an external device; a memory configured to store a genetic algorithm and a machine learning model; and a processor electrically connected with the communication circuit and the memory. The processor may be configured to: obtain, via the communication circuit, traffic accident data associated with a traffic accident; select input data, which includes at least a part of the traffic accident data, for training of the machine learning model, the input data selected using the genetic algorithm; train the machine learning model using the input data; and predict an injury level of the user of the vehicle using the trained machine learning model when the training of the machine learning model is completed.

12 Claims, 6 Drawing Sheets

(51) Int. Cl.
*G06N 5/04* (2006.01)
*G06N 20/10* (2019.01)
*G07C 5/00* (2006.01)
*G06N 3/08* (2006.01)
*G06N 3/12* (2006.01)
*G06N 20/00* (2019.01)
*G06N 7/00* (2006.01)

(56) References Cited

OTHER PUBLICATIONS

Kusano et al., "Comparison and Validation of Injury Risk Classifiers for Advanced Automated Crash Notification System", Traffic Injury Prevention, 15(sup1):S126-S133; Sep. 2014.

* cited by examiner

APPARATUS AND METHOD FOR PREDICTING INJURY LEVEL

CROSS-REFERENCE TO RELATED APPLICATION

This application claims the benefit of priority to Korean Patent Application No. 10-2019-0028225, filed in the Korean Intellectual Property Office on Mar. 12, 2019, the entire contents of which are incorporated herein by reference.

TECHNICAL FIELD

The present disclosure relates to an apparatus and method for predicting an injury level of a passenger due to a traffic accident.

BACKGROUND

Recently, a system has been employed to predict injury levels of vehicular passengers involved in a traffic accident using data collected in the vehicle when the traffic accident occurs. By predicting the injury levels the system may reduce the fatality rate of seriously injured victims, for example. The system may predict the injury level, e.g., an injury severity score (ISS), based on data such as the national automotive sampling system/crashworthiness data system (NASS/CDS) database. In some cases, the injury level may be predicted using a machine learning model such as logistic regression, a random forest, or a support vector machine (SVM). The degree of injury for specific body portions of a passenger can also be predicted using data collected by the vehicle indicating the direction of collision.

Optimization of such system can be difficult, however. For example, data used for training of the machine learning model must be configured through a recursive test. Similarly, a recursive test must be used to discover the structure of the machine learning model for the purpose of enhancing prediction performance.

SUMMARY

The present disclosure has been made to solve the above-mentioned problems occurring in the related art while advantages achieved by the related art are maintained intact.

An aspect of the present disclosure provides an apparatus and method for efficiently determining a combination of input data for training of a machine learning model for predicting an injury level and a structure of the machine learning model.

The technical problems to be solved by the present inventive concept are not limited to the aforementioned problems, and any other technical problems not mentioned herein will be clearly understood from the following description by those skilled in the art to which the present disclosure pertains.

According to embodiments of the present disclosure, an apparatus for predicting an injury level of a user of a vehicle may include: a communication circuit configured to communicate with an external device; a memory configured to store a genetic algorithm and a machine learning model; and a processor electrically connected with the communication circuit and the memory. The processor may be configured to: obtain, via the communication circuit, traffic accident data associated with a traffic accident; select input data, which includes at least a part of the traffic accident data, for training of the machine learning model, the input data selected using the genetic algorithm; train the machine learning model using the input data; and predict an injury level of the user of the vehicle using the trained machine learning model when the training of the machine learning model is completed.

The processor may obtain, via the communication circuit, the traffic accident data from a national automotive sampling system/crashworthiness data system (NASS/CDS) database.

The processor may calculate a fitness of the input data for the machine learning model using a fitness function.

The processor may repeatedly select the input data and train the machine learning model using the input data until the fitness of the input data meets a specified condition.

The input data may include data indicating data to be used for training the machine learning model and data indicating a structure of the machine learning model.

The processor may identify data having an influence on the injury level among the traffic accident data using the genetic algorithm.

The processor may determine data to be used for training the machine learning model among the traffic accident data using the genetic algorithm.

The processor may determine a structure of the machine learning model using the genetic algorithm.

The machine learning model may include a decision tree, a random forest, a support vector machine (SVM), a multilayer perceptron (MLP), or any combination thereof.

The machine learning model may be configured to learn a criterion for classifying the injury level.

The processor may predict the injury level by inputting test data to the trained machine learning model, when the test data is obtained.

Furthermore, according to embodiments of the present disclosure, a method for predicting an injury level of a user of a vehicle may include: obtaining, via a communication circuit, traffic accident data associated with a traffic accident; selecting, by a processor electrically connected with the communication circuit, input data, which includes at least a part of the traffic accident data, for training of a machine learning model, the input selected using a genetic algorithm; training, by the processor, the machine learning model using the input data; and predicting, by the processor, an injury level of the user of the vehicle using the trained machine learning model when the training of the machine learning model is completed.

BRIEF DESCRIPTION OF THE DRAWINGS

The above and other objects, features and advantages of the present disclosure will be more apparent from the following detailed description taken in conjunction with the accompanying drawings.

Figure 1:
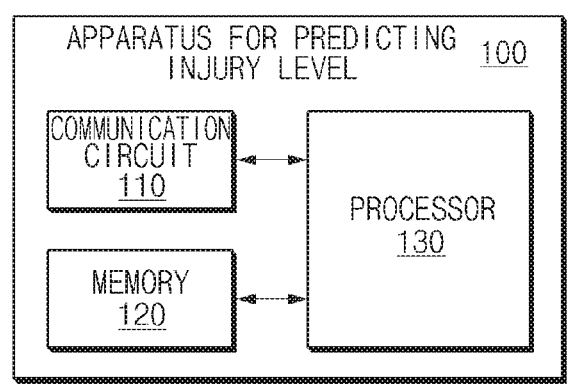
FIG. 1 is a block diagram illustrating a configuration of an apparatus for predicting an injury level according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiments of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, devices, or the like, as described herein. Moreover, it is understood that the below methods may be executed by an apparatus comprising the control unit in conjunction with one or more other components, as would be appreciated by a person of ordinary skill in the art.

Referring now to the presently disclosed embodiments, FIG. 1 is a block diagram illustrating a configuration of an apparatus for predicting an injury level of a user (e.g., driver, passenger, etc.) of a vehicle according to embodiments of the present disclosure.

As shown in FIG. 1, an apparatus 100 for predicting an injury level according to embodiments of the present disclosure may include a communication circuit, a memory 120, and a processor 130. The apparatus 100 for predicting the injury level may be a device capable of predicting an injury level of a passenger, when an accident occurs, using a genetic algorithm and a machine learning model based on traffic accident data.

The communication circuit 110 may be configured to communicate with an external device. For example, the communication circuit 110 may communicate with an external database (e.g., a national automotive sampling system/crashworthiness data system (NASS/CDS)). For another example, the communication circuit 110 may transmit and receive accident data and/or a predicted result with the external device.

The memory 120 may store the genetic algorithm and the machine learning model. The machine learning model may include, for example, a decision tree, a random forest, a support vector machine (SVM), and/or a multilayer perceptron (MLP). According to embodiments of the present disclosure, the memory 120 may store accident data.

The processor 130 may be electronically connected with the communication circuit 110 and the memory 120. The processor 130 may control the communication circuit 110 and the memory 120 may perform a variety of data processing and various arithmetic operations.

According to embodiments of the present disclosure, the processor 130 may obtain data associated with a traffic accident, i.e., "traffic accident data." The processor 130 may obtain data from a database which stores old traffic accident data. For example, the processor 130 may obtain traffic accident data from an NASS/CDS database, using the communication circuit 110. For another example, the processor 130 may obtain traffic accident data from a database stored in the memory 120.

The processor 130 may select a combination of input data including a part of the obtained data for training of the machine learning model using the genetic algorithm. The combination of the input data may include, for example, data (indicated with '0' or '1') indicating data to be used for training and data indicating a structure of the machine learning model among the traffic accident data. The processor 130 may identify data which has an influence on an injury level among the obtained data using the genetic algorithm. The processor 130 may determine data to be used in the machine learning model among the obtained data using the genetic algorithm. The processor 130 may determine a structure of the machine learning model using the genetic algorithm. The processor 130 may randomly select a part of the obtained data as an initial population of the genetic algorithm.

The processor 130 may provide the combination of the input data to the machine learning model. The machine learning model may learn a criterion of classifying an injury level using the combination of the input data. The processor 130 may determine a fitness of the combination of the input data for the machine learning model using a fitness function. The processor 130 may repeatedly select and provide the combination of the input data, until the fitness meets a specified condition. For example, the processor 130 may repeatedly perform steps, such as selection, crossover, mutation, and estimation of a fitness function, until a condition where the genetic algorithm is ended is met.

When the training of the machine learning model is completed, the processor 130 may predict an injury level using the trained machine learning model. For example, when test data is obtained, the processor 130 may predict the injury level by inputting the test data to the trained machine learning model. The test data may be, for example, data collected by a sensor upon occurrence of an accident required to predict the injury level.

As described above, a feature point for the combination of the input data and the structure of the machine learning model may be extracted using the genetic algorithm. For example, any data combination when there are a plurality of input data may be generated using the genetic algorithm to find an optimal data combination and may generate a data combination for a structure of the machine learning model to find an optimal structure. As a result, performance of predicting the injury level may be increased.

Figure 2:
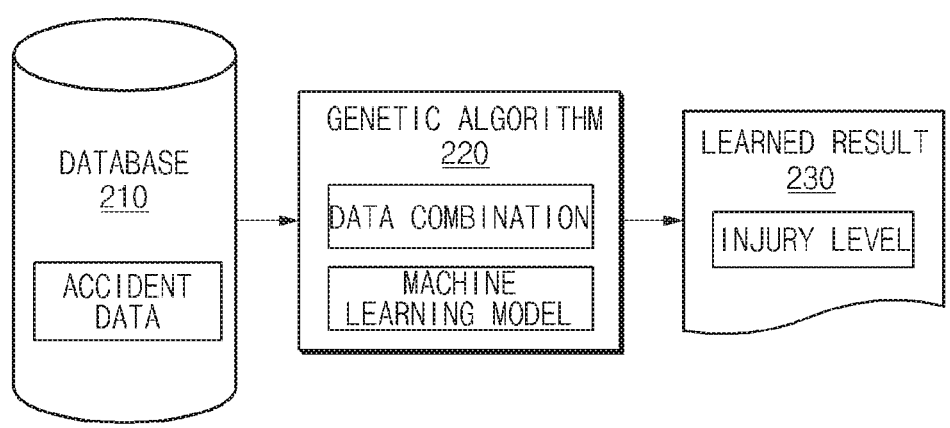
FIG. 2 is a block diagram illustrating data processing in an apparatus for predicting an injury level according to embodiments of the present disclosure.

FIG. 2 is a block diagram illustrating data processing in an apparatus for predicting an injury level of a user of a vehicle according to embodiments of the present disclosure.

As shown in FIG. 2, a database 210 may include traffic accident data. The traffic accident data may be, for example, data collected upon occurrence of past traffic accidents.

A genetic algorithm 220 may be used by the processor 130 to generate an optimal data combination capable of enhancing performance of a machine learning model and may use the generated data combination as input data for training of the machine learning model. The genetic algorithm 220 may be used by the processor 130 to combine data obtained from the database 210. The genetic algorithm 220 may be used by the processor 130 to train the machine learning model by inputting the generated data combination to the machine learning model. The genetic algorithm 220 may be used by the processor 130 to determine a fitness of the data combination by evaluating performance of the trained machine learning model. The genetic algorithm 220 may be used by the processor 130 to generate the optimal data combination by repeating the combination of data and the learning.

The machine learning module may output a trained result 230. The trained result 230 may be the result of predicting an injury level. When data collected by a sensor is obtained when a traffic accident occurs, the machine learning module may predict an injury level based on the collected data.

Figure 3:
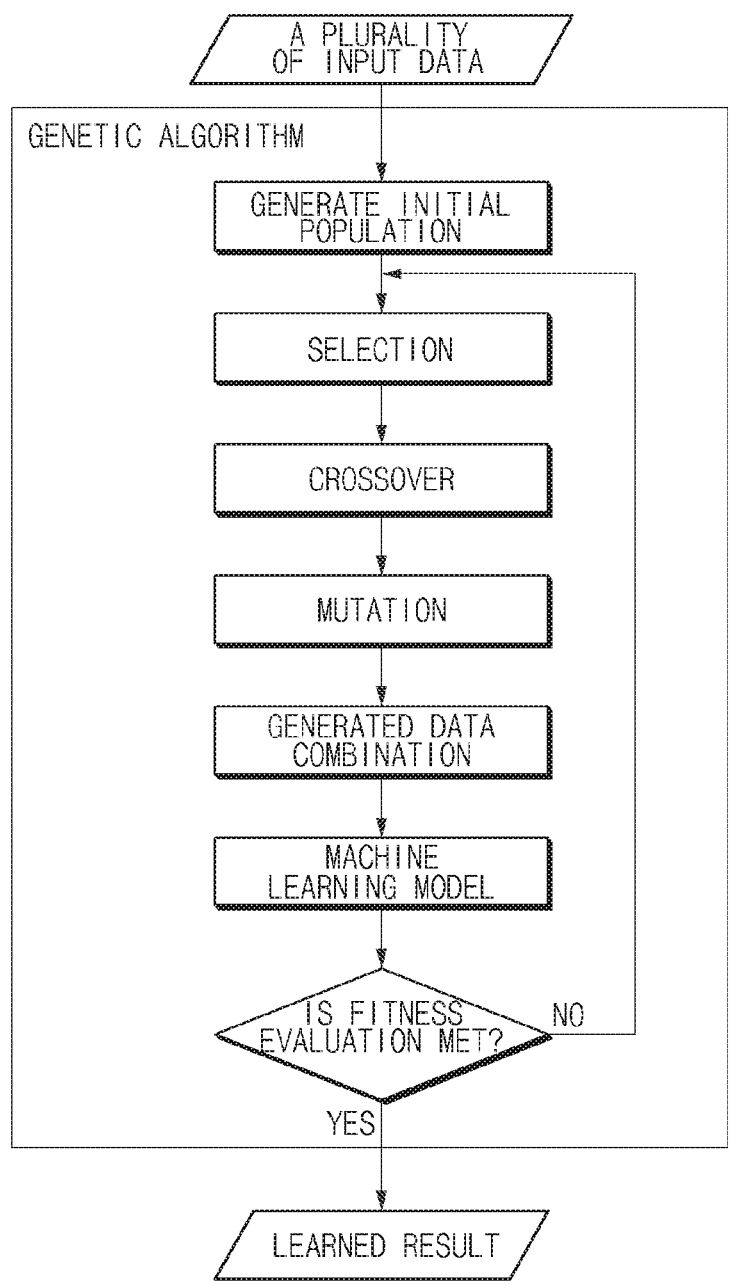
FIG. 3 is a drawing illustrating an exemplary operation of a genetic algorithm used in an apparatus for predicting an injury level according to embodiments of the present disclosure.

FIG. 3 is a drawing illustrating an exemplary operation of a genetic algorithm used in an apparatus for predicting an injury level of a user of a vehicle according to embodiments of the present disclosure.

As shown in FIG. 3, a genetic algorithm may obtain a plurality of input data from a database. The genetic algorithm may generate an initial population based on data obtained from an NASS/CDS database. The genetic algorithm may select a data combination transferred from a current generation to a next generation among generated data combinations. The genetic algorithm may perform a crossover operation for the selected data combination to advance a crossover process. A data combination of the next generation may be generated through the crossover process. The genetic algorithm may perform a mutation operation for the crossover data combination such that the crossover data combination is transformed into any another data to generate a mutation data combination. The genetic algorithm may provide the generated data combination to a machine learning model. The machine learning model may learn a criterion of classifying an injury level, using the provided data combination. The genetic algorithm may perform fitness evaluation using a fitness function and may repeat the above-mentioned process until the fitness evaluation is satisfied. NASS/CDS data may include a plurality of input factors. Because all the plurality of input factors does not have an influence on an injury level, the genetic algorithm may extract a factor which has an influence on the injury level. When the fitness evaluation is satisfied, the trained machine learning model may output the trained result. When new input data which is not used for learning is input, the trained machine learning model may output the result of predicting the injury level.

Figure 4:
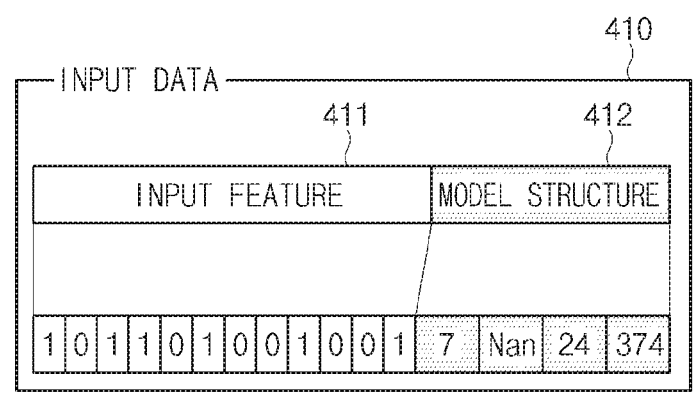
FIG. 4 is a drawing illustrating exemplary data used in an apparatus for predicting an injury level according to embodiments of the present disclosure.

FIG. 4 is a drawing illustrating exemplary data used in an apparatus for predicting an injury level according to embodiments of the present disclosure.

As shown in FIG. 4, an input data 410 according to embodiments of the present disclosure may include data for an input feature 411 and a model structure 412. The input feature 411 may be binary data for discriminating between a feature selected by a genetic algorithm and a feature which is not selected by the genetic algorithm. For example, in the input feature 411, data '1' may refer to the selected feature and data '0' may refer to the feature which is not selected. The model structure 412 may be data indicating a structure of a machine learning model. The model structure 412 may be configured to vary with a type of the used machine learning model.

Figure 5:
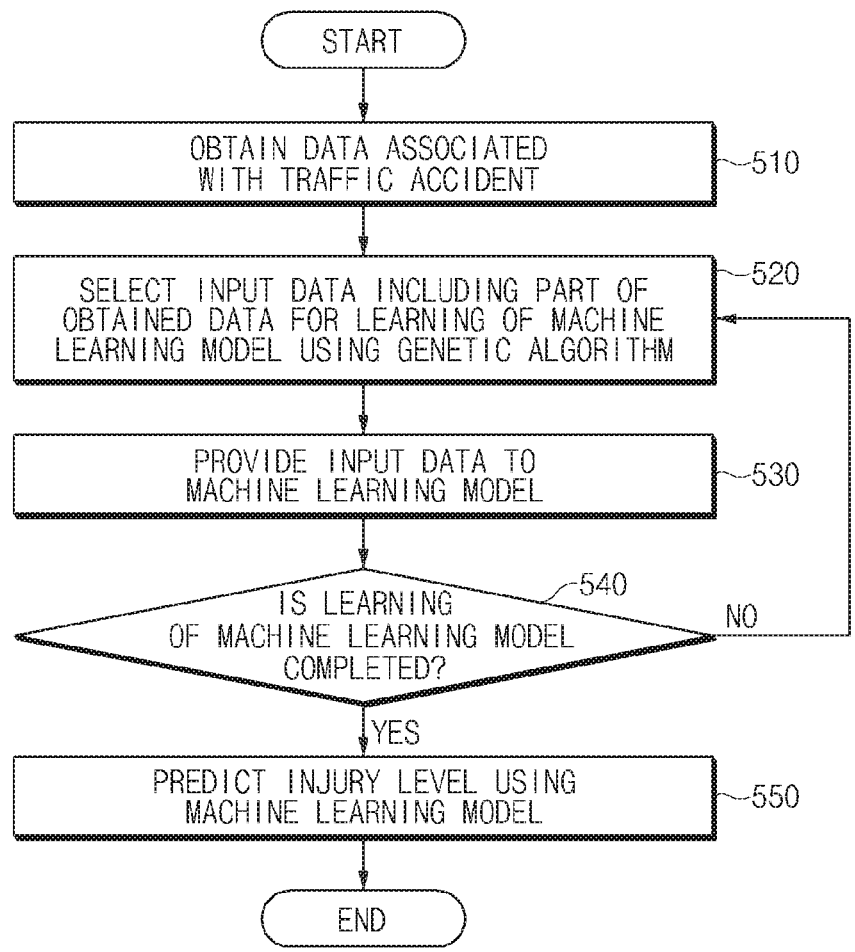
FIG. 5 is a flowchart illustrating a method for predicting an injury level according to embodiments of the present disclosure.

FIG. 5 is a flowchart illustrating a method for predicting an injury level of a user of a vehicle according to embodiments of the present disclosure.

Hereinafter, it is assumed that a vehicle including an apparatus 100 for predicting the injury level in FIG. 1 performs a process of FIG. 5. Furthermore, in a description of FIG. 5, an operation described as being performed by the vehicle may be understood as being controlled by a processor 130 of the apparatus 100 for predicting the injury level.

As shown in FIG. 5, in operation 510, the vehicle may obtain traffic accident data associated with a traffic accident. For example, the vehicle may obtain previously stored traffic accident data from a database.

In operation 520, the vehicle may select input data including a part of the obtained data for training of a machine learning model using a genetic algorithm. For example, the vehicle may select the input data by combining the obtained data.

In operation 530, the vehicle may provide the input data to the machine learning model to train the machine learning model. For example, the vehicle may input the input data to the machine learning model for the training of the machine learning model.

In operation 540, the vehicle may determine whether the training of the machine learning model is completed. For example, the vehicle may determine whether the genetic algorithm is ended, using a fitness function.

In operation 550, the vehicle may predict an injury level using the trained machine learning model. For example, when new accident data which is not used for learning is input, the vehicle may input the input accident data to the machine learning model and may output an injury level predicted by means of the machine learning model.

Figure 6:
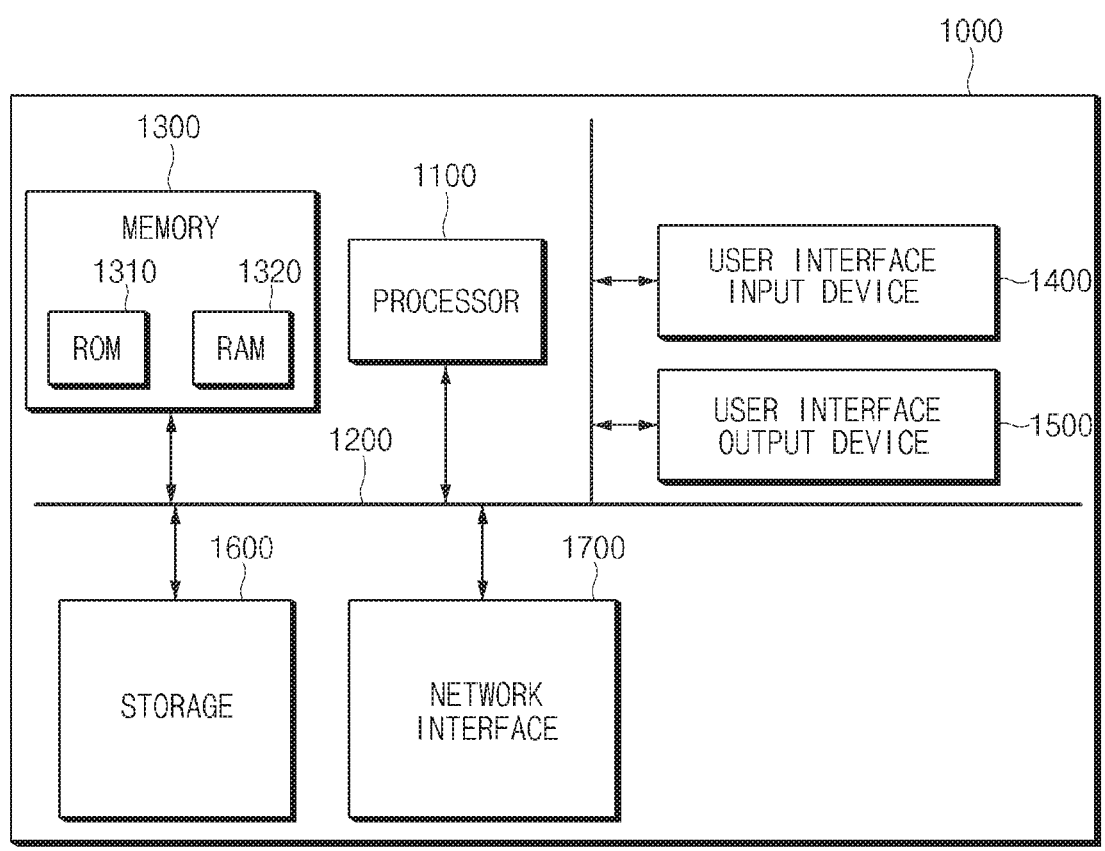
FIG. 6 is a block diagram illustrating a configuration of a computing system according to embodiments of the present disclosure.

FIG. 6 is a block diagram illustrating a computing system according to embodiments of the present disclosure.

As shown in FIG. 6, the above-mentioned method according to embodiments of the present disclosure may be implemented by means of the computing system. The computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The apparatus and method for predicting the injury level according to embodiments of the present disclosure may enhance the performance of predicting the injury level by determining a combination of input data for training of the machine learning model and a structure of the machine learning model using the genetic algorithm.

Furthermore, the apparatus and method for predicting the injury level according to embodiments of the present disclosure may analyze a combination of input data using the genetic algorithm to identify a factor which causes a high injury level and use the identified result to reduce damage in traffic accidents.

Furthermore, the apparatus and method for predicting the injury level according to embodiments of the present disclosure may take suitable measures for safety of a passenger when a traffic accident occurs, by accurately predicting the injury level.

Various additional effects directly or indirectly ascertained through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for predicting an injury level of a user of a vehicle, the apparatus comprising:
    a communication circuit configured to communicate with an external device;
    a memory configured to store a genetic algorithm having machine readable instructions and a machine learning model; and
    a processor electrically connected with the communication circuit and the memory,
    wherein the processor is configured to:
    obtain, via the communication circuit, traffic accident data including accident attributes and passenger injury information associated with a traffic accident;
    extract, as input data, a factor which has an influence on the injury level from the traffic accident data using the genetic algorithm;
    train the machine learning model using the input data; and
    predict an injury level of the user of the vehicle using the trained machine learning model when the training of the machine learning model is completed.

2. The apparatus of claim 1, wherein the processor is configured to:
    obtain, via the communication circuit, the traffic accident data from a national automotive sampling system/crashworthiness data system (NASS/CDS) database.

3. The apparatus of claim 1, wherein the processor is configured to:
    calculate a fitness of the input data for the training machine learning model using a fitness function.

4. The apparatus of claim 3, wherein the processor is configured to:
    repeatedly select the input data and train the machine learning model using the input data until the fitness of the input data meets a specified condition.

5. The apparatus of claim 1, wherein the input data includes data indicating data to be used for training the machine learning model and data indicating a structure of the machine learning model.

6. The apparatus of claim 1, wherein the processor is configured to:
    identify data having an influence on the injury level among the traffic accident data using the genetic algorithm.

7. The apparatus of claim 1, wherein the processor is configured to:
    determine data to be used for training the machine learning model among the traffic accident data using the genetic algorithm.

8. The apparatus of claim 1, wherein the processor is configured to:
    determine a structure of the machine learning model using the genetic algorithm.

9. The apparatus of claim 1, wherein the machine learning model includes a decision tree, a random forest, a support vector machine (SVM), a multilayer perceptron (MLP), or any combination thereof.

10. The apparatus of claim 1, wherein the machine learning model is configured to learn a criterion for classifying the injury level.

11. The apparatus of claim 1, wherein the processor is configured to:
- predict the injury level by inputting test data to the trained machine learning model when the test data is obtained.

12. A method for predicting an injury level of a user of a vehicle, the method comprising:
- obtaining, via a communication circuit, traffic accident data including accident attributes and passenger injury information associated with a traffic accident;
- extracting, by a processor electrically connected with the communication circuit, as input data, a factor which has an influence on the injury level from the traffic accident data using a genetic algorithm having machine readable instructions;
- training, by the processor, a machine learning model using the input data; and
- predicting, by the processor, an injury level of the user of the vehicle using the trained machine learning model when the training of the machine learning model is completed.

* * * * *